United States Patent
Tourapis et al.

(10) Patent No.: US 10,136,033 B2
(45) Date of Patent: *Nov. 20, 2018

(54) TECHNIQUES FOR ADVANCED CHROMA PROCESSING

(71) Applicant: Apple Inc., Cupertino, CA (US)

(72) Inventors: Alexandros Michael Tourapis, Milpitas, CA (US); Yeping Su, Sunnyvale, CA (US); David William Singer, San Francisco, CA (US); Hsi-Jung Wu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/650,750

(22) Filed: Jul. 14, 2017

(65) Prior Publication Data

US 2017/0318191 A1 Nov. 2, 2017

Related U.S. Application Data

(62) Division of application No. 14/875,432, filed on Oct. 5, 2015, now Pat. No. 9,736,335.

(Continued)

(51) Int. Cl.
*H04N 1/60* (2006.01)
*H04N 9/67* (2006.01)
(Continued)

(52) U.S. Cl.
CPC ......... *H04N 1/6005* (2013.01); *H04N 1/6058* (2013.01); *H04N 9/67* (2013.01);
(Continued)

(58) Field of Classification Search
CPC .. H04N 1/6005; H04N 1/6058; H04N 1/6027; H04N 9/64; H04N 9/67; H04N 19/186; H04N 19/46; H04N 19/85
See application file for complete search history.

(56) References Cited

U.S. PATENT DOCUMENTS

| H1506 H | * | 12/1995 | Beretta | ............... | G06F 3/04845 |
| | | | | | 345/549 |
| 5,596,418 A | * | 1/1997 | Strolle | .................. | H04N 5/923 |
| | | | | | 348/427.1 |

(Continued)

FOREIGN PATENT DOCUMENTS

| EP | 1560417 A2 | 8/2005 |
| EP | 2120448 A1 | 11/2009 |

(Continued)

OTHER PUBLICATIONS

Devereux; "Limiting of YUV Digital Video Signals"; BBC Research Dept. Report; No. 22; Dec. 1987; 16 pages.

(Continued)

*Primary Examiner* — Michael E Teitelbaum
*Assistant Examiner* — Sean N. Haiem
(74) *Attorney, Agent, or Firm* — Baker & Hostetler LLP

(57) ABSTRACT

Image and video processing techniques are disclosed for processing components of a color space individually by determining limits for each component based on the relationship between each component in a color space. These limits may then be used to clip each component such that the component values are within the determined range for that component. In this manner, more efficient processing of images and/or video may be achieved.

24 Claims, 7 Drawing Sheets

Related U.S. Application Data

(60) Provisional application No. 62/148,066, filed on Apr. 15, 2015.

(51) Int. Cl.
  *H04N 19/186* (2014.01)
  *H04N 19/46* (2014.01)
  *H04N 19/85* (2014.01)

(52) U.S. Cl.
  CPC ........... *H04N 19/186* (2014.11); *H04N 19/46* (2014.11); *H04N 19/85* (2014.11)

(56) References Cited

U.S. PATENT DOCUMENTS

| | | | | |
|---|---|---|---|---|
| 6,510,242 | B1* | 1/2003 | Westerman | H04N 9/646 348/E9.042 |
| 7,403,205 | B2* | 7/2008 | Zeng | G09G 5/02 345/590 |
| 2003/0160900 | A1* | 8/2003 | Dumitras | H04N 9/67 348/649 |
| 2004/0170319 | A1* | 9/2004 | Maurer | H04N 1/6027 382/167 |
| 2008/0259216 | A1* | 10/2008 | Yoshida | G09G 5/003 348/649 |
| 2011/0149307 | A1* | 6/2011 | Tin | H04N 1/6033 358/1.9 |
| 2013/0321675 | A1* | 12/2013 | Cote | H04N 9/64 348/242 |
| 2013/0322752 | A1* | 12/2013 | Lim | G06T 5/002 382/167 |
| 2013/0322753 | A1* | 12/2013 | Lim | G06T 5/001 382/167 |
| 2014/0112394 | A1* | 4/2014 | Sullivan | H04N 19/46 375/240.26 |
| 2014/0133749 | A1* | 5/2014 | Kuo | H04N 5/213 382/167 |
| 2015/0221280 | A1* | 8/2015 | Van Der Vleuten | H04N 1/6027 382/167 |
| 2015/0296193 | A1* | 10/2015 | Cote | H04N 9/646 382/167 |

FOREIGN PATENT DOCUMENTS

| | | |
|---|---|---|
| WO | 00/64189 A2 | 10/2000 |
| WO | 2008/080434 A1 | 7/2008 |

OTHER PUBLICATIONS

International Patent Application No. PCT/US2016/026374; Int'l Search1 Report and the Written Opinion; dated Jul. 5 2016.
International Patent Application No. PCT/US2016/026374; Int'l Preliminary Report on Patentability; dated Oct. 26, 2017; 11 pages.

\* cited by examiner

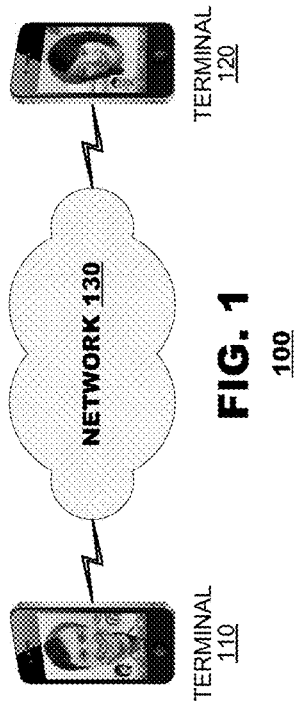
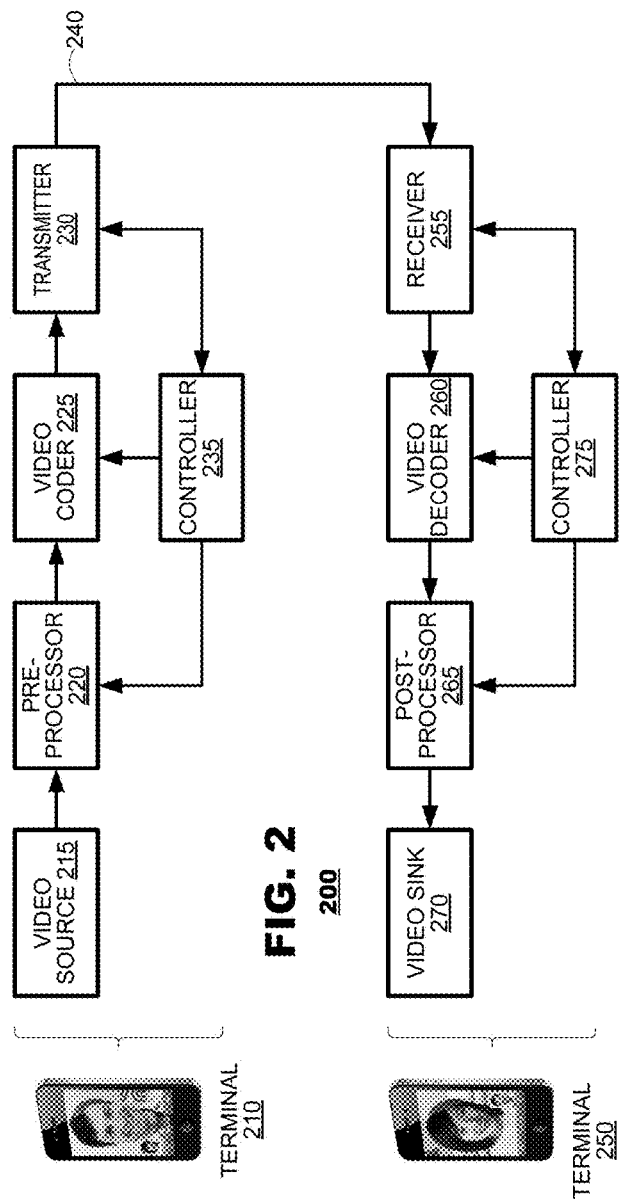

300

400

500

600

700

800

900

TECHNIQUES FOR ADVANCED CHROMA PROCESSING

CLAIM FOR PRIORITY

The present application is a divisional of U.S. application Ser. No. 14/875,432, entitled "Techniques for Advanced Chroma Processing," filed Oct. 5, 2015, which benefits from priority of U.S. application No. 62/148,066, entitled "Techniques for Advanced Chroma Processing," filed Apr. 15, 2015, the disclosure of which is incorporated herein in its entirety.

BACKGROUND

The present disclosure relates to image and video processing and, in particular, to improved image and video processing by using the characteristics of a color space.

Many modern electronic devices support exchange of video between them. In many applications, a first device captures video locally and codes it for transmission to a second device. The second device may decode the coded video and display it locally. The first device may perform pre-processing operations upon the source video to condition it for coding and/or transmission. Typical pre-processing operations include color space conversion, resizing of video, frame rate conversion of video and/or video filtering operations among others. Several coding protocols have been defined to support video coding and decoding operations. They include, for example, the MPEG-2, MPEG-4, H.263, H.264 and/or HEVC coding protocols.

The majority of digital image and video applications employ a Y'CbCr color space encoding for the representation of images, given its ability to better take into account human visual perception than other color spaces such as RGB or XYZ. Y'CbCr, also called YCbCr, Y'UV, or YUV, comprises of a luma (Y') component, and two chroma/color components (Cb and Cr) for each pixel. The prime (') symbol indicates the application of a transfer function on the original linear light R, G, and B signals, allowing for perceptual quantization. However, a number of other color spaces may also be used.

The components of a color space share certain relationships with each other. For example, in a YCrCb color space, the Y component may be calculated given the R, G and B components of an input signal as long as general characteristics of the video signal are known. For example, general characteristics of the video signal may include the color primaries being used, e.g. whether the signal uses BT.2020, P3D65, or BT.709 color primaries, the chroma sampling (phase) location, the color difference processes (or as are commonly called in some specifications the matrix coefficients), and the transfer functions applied to the original linear light signals, among others. Similarly, Cr and Cb components may be calculated using the Y and R, G, and B values along with the general characteristics of the video signal. Given the relationship of Cb or Cr with Y, as well as of Y with B and R respectively, limits on the value of Cb and Cr are impacted by the value of Y. If Y is known, then Cb and/or Cr are only allowed to be within a particular range of values.

However, existing algorithms tend to process each component independently, without taking into account the limitations in value that may be imposed upon certain components by previously calculated components. For example, during an encoding operation (assuming input data is provided in an N-bit integer representation, e.g. N=8) values commonly are clipped independently to stay within the valid limits of the N-bit representation, i.e. from a value of 0 up to $(2^N)-1$. Further, if an encoder determines that image data corresponds to a particular limited representation, such as the standard/limited representation used for TV applications, additional clipping within that range may be performed. However, existing algorithms perform additional clipping only when the signal is fully converted back to an RGB representation. This may result in accumulation of out of range sample values, and thus introduce artifacts in the final image representation.

The inventors perceive a need for a chroma processing scheme that can operate on each component in a color space individually, and operate on subsequent components with respect to previously ascertained components, taking into account the relationships between the components to allow for more efficient processing.

BRIEF DESCRIPTION OF THE DRAWINGS

FIG. 1 illustrates an environment where the principles of the present disclosure may find application.

FIG. 2 illustrates a system according to an embodiment of the present disclosure.

DETAILED DESCRIPTION

Figure 3:
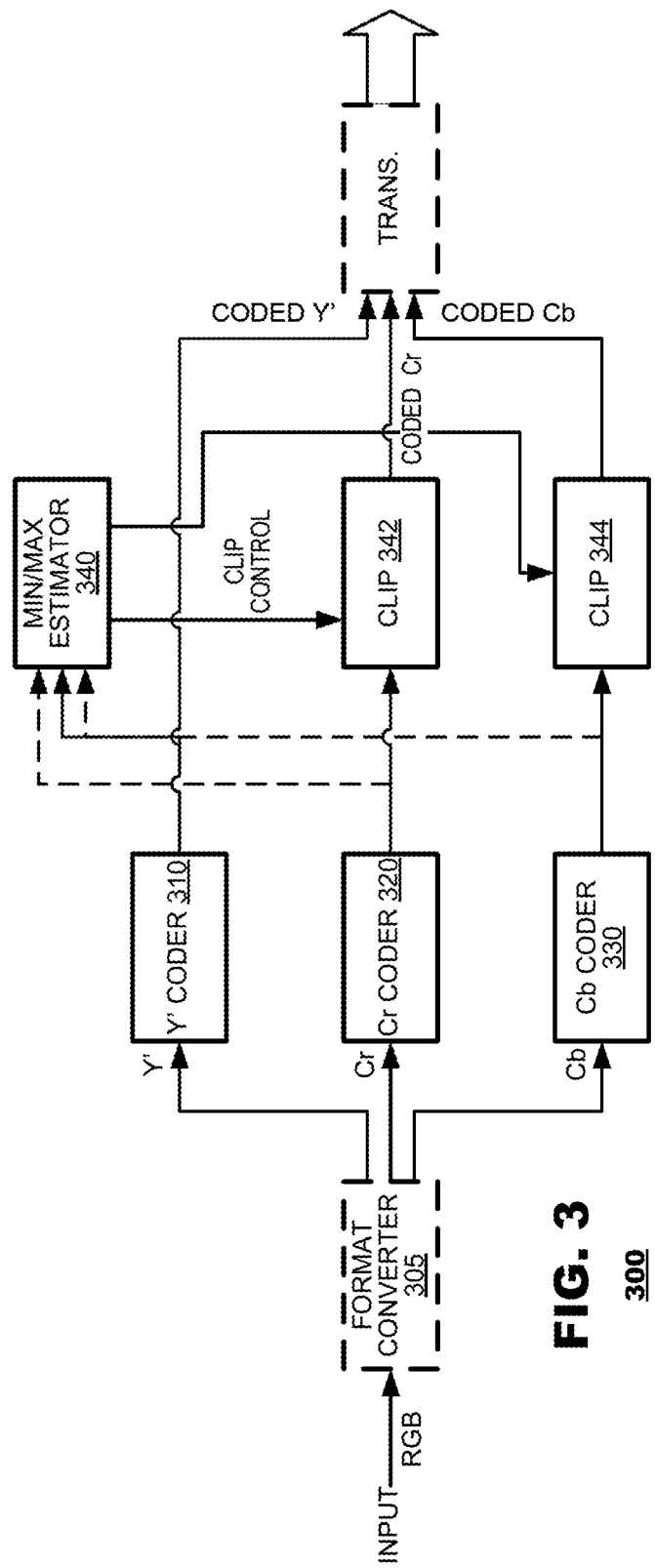
FIG. 3 illustrates a system according to a further embodiment of the present disclosure.

Embodiments of the present disclosure provide techniques for processing individual components of a color space with respect to previously processed components of the color space based on the relationships between each component. Thus, processing of a luma component may allow a range of values for each of a pair of chroma components to be determined. A processing operation may be performed upon a first chroma component to obtain a set of values for the first component. Subsequently, values from the set of values for the first component that are outside the determined range of values for the first component may be clipped. A range of limits for a second color component may be determined based on the clipped set of values for the first component and/or the processed luma component. A processing operation may be performed upon the second chroma component to obtain a set of values for the second component. Subsequently, values from the set of values for the second component that are outside the determined range of values for the second component may be clipped. Clipping each component in this manner may prevent the propagation of an unclipped signal through each processing stage which could result in large errors and the presence of artifacts in the image signal. In addition, the number of bits required to represent each component may be reduced as the bit depth required to represent each component may be modified based on the determined range of values for each component.

The principles of the present disclosure find application in applications that perform exchange of coded image and video data. Examples of such applications include but are not limited to video/image encoding, format conversion (i.e. conversion from a 4:2:0 or 4:2:2 YCbCr representation to a 4:4:4 representation), image scaling, spatio-temporal filtering such as denoising, and frame rate conversion among others. One such application is illustrated in FIG. 1, where a system 100 includes a pair of terminals 110, 120 provided in communication by a network 130. The terminals 110, 120 may support either unidirectional or bidirectional exchange of coded video data. For bidirectional video exchange, each of the terminals 110, 120 may capture video data at a local location and code the video data for transmission to the other terminal via the network 130. Each terminal 110, 120 may receive the coded video data of the other terminal from the network 130, decode the coded data and display the recovered video data locally. For unidirectional exchange of video, only one of the terminals (say, terminal 110) would capture video locally and code it for transmission to the other terminal 120. The second terminal 120 would decode the coded video and display it locally.

In FIG. 1, the terminals 110, 120 are illustrated as smart phones but the principles of the present disclosure are not so limited. Embodiments of the present disclosure find application with personal computers (both desktop and laptop computers), tablet computers, computer servers, media players and/or dedicated video conferencing equipment. The network 130 represents any number of networks that convey coded video data between the terminals 110, 120, including for example wire-line and/or wireless communication networks. The communication network 130 may exchange data in circuit-switched and/or packet-switched channels. Representative networks include telecommunications networks, local area networks, wide area networks and/or the Internet. For the purposes of the present discussion, the architecture and topology of the network 130 are immaterial to the operation of the present disclosure unless explained herein.

FIG. 2 illustrates a simplified functional block diagram of functional units within terminals 210, 250 to support video exchange, according to an embodiment of the present disclosure. The terminal 210, for example, may include a video source 215, a pre-processor 220, a video coder 225 and a transmitter 230, all operating under control of a controller 235. The video source 215 may provide source video data representing the video content to be coded and transmitted to the second terminal 250. The pre-processor 220 may perform signal conditioning operations to tailor the source video data for coding by the video coder 225. The video coder 225 may code the source video data according to predictive coding techniques to reduce the video's bandwidth. The transmitter 230 may format coded video data from the video coder 225 for transmission to the second terminal 250 via a channel 240.

The video source 215 may be represented by a camera system that may include an image sensor and related circuitry to generate video data representing locally-captured image content. In other embodiments, however, the video source 215 may be represented by a storage device that stores video data authored from other sources (for example, computer graphics or the like). Alternatively, the source video may include synthetically-generated image content authored by an application or other processes that executes on the terminal 210. Source video may be output from the video source in a first format (such as RGB).

The pre-processor 220 may perform operations upon the source video to condition it for coding and/or transmission. Typical pre-processing operations include color space conversion, resizing of video, frame rate conversion of video and/or video filtering operations. Color space conversion may convert the source video from its first format to a second format on which the video coder 225 operates (such as Y'CrCb). Resizing operations may enlarge or reduce the size of video frames in the source video. Frame rate conversions may increase or decrease the frame rate of the source video. Filtering operations may include a variety of processing operations to either increase or decrease spatial and/or temporal smoothness of content in the source video. While the present discussion focuses on color space control operations of the pre-processor 220, in practice, such operations may be performed cooperatively with other pre-processing operations as may be desired to achieve given application needs. Moreover, the types of pre-processing operations applied to source video may vary dynamically based on operating conditions of the terminal 210, including availability of processing resources at the terminal 210, conditions of a channel 240 and any operating conditions of a far end terminal 250 that are reported to the terminal 210. The pre-processor 220 may provide pre-processed video to the video coder 225.

The video coder 225 may code the video data presented to it by the pre-processor 220. The video coder 225 may exploit spatial and/or temporal redundancies in the input video by coding the input video according to motion-compensated prediction. Such processes typically involve coding content of a new frame with reference to content of previously-coded reference frames. When a prediction is made between content of a new frame and a previously-coded reference frame, the video coder 225 may provide prediction references (which may be explicit or implicit) in the coder's output, which allows a decoder to invert the prediction operations during decoding. Prediction often operates on spatial areas of an input frame (called, "pixel blocks" herein), on a pixel-block-by-pixel-block basis. Such prediction references often include motion vectors, which identify spatial translations of image content between a frame being coded and a reference frame. The video coder 225 also may include a local decoder (not shown) to decode and store coded video data of reference frames for use in subsequent prediction operations. Video coding operations may occur according to predetermined coding protocols such as the MPEG-2, MPEG-4, H.263, H.264 and/or HEVC coding protocols.

The transmitter 230 may format coded video data for transmission in a channel 240. The channel 240 itself may operate according to predetermined communication protocols. The transmitter 230 may format the coded video data according to the protocols that are appropriate for the channel 240 and may output the coded video data to the channel 240.

The second terminal 250 may include a receiver 255, video decoder 260, post-processor 265 and video sink 270. The receiver 255 may receive data from the channel 240 and parse the channel data into various data stream(s), including a stream of coded video. The video decoder 260 may decode the coded video data, inverting coding processes performed by the video coder 225, to recover video data therefrom. The post-processor 265 may perform signal conditioning operations on recovered video data from the video coder to improve video quality prior to rendering. The video sink 270 may consume video data output by the post-processor 265, typically, by displaying it on a display of the terminal 250.

As noted, the video decoder 260 may decode the video data by inverting coding processes applied by the video coder 225. The video decoder 260 may interpret coded video to identify prediction references therein, then apply them during coding operations. Thus, when the video coder 225 codes a given pixel block of a new frame using a reference frame as a source of prediction, the video decoder 260 may use the prediction reference data to identify the same content of the reference frame that video coder 225 used and perform its own prediction operation. The video decoder 260 may output recovered video to the pre-processor. The video decoder 260 also may store video of recovered reference frames for use in subsequent prediction operations. As with the video coder 225, video decoding operations may occur according predetermined coding protocols such as the MPEG-2, MPEG-4, H.263, H.264 and/or HEVC coding protocols.

The post-processor 265 may perform additional video processing to condition the recovered video data for rendering, commonly at a display device. Typical post-processing operations may include color space conversions, filtering, resizing and/or frame rate conversions. Color space conversion may involve converting recovered video data from a format used by the video decoder 260 (such as Y'CrCb) to an output format appropriate for the video sink 270; the output format may but need not be the same format as the video supplied by the video source 215. Common filtering operations include deblocking filters, edge detection filters, ringing filters and the like. Resizing operations may enlarge or reduce the size of video frames in the recovered video. Frame rate conversions may increase or decrease the frame rate of the recovered video. The post-processor 265 may output recovered video sequence to video sink 270.

The video sink 270 may consume recovered video data output by the post-processor 265. Most often, the video sink 270 may be represented by a display that renders the recovered video data for view on the terminal 250. Video sinks 270 may include storage devices that store recovered video data later use by the terminal 250, such as by later viewing or later transmission to other devices (not shown).

The functional blocks illustrated in FIG. 2 support video coding and decoding in one direction only. For bidirectional communication, terminal 250 may include functional blocks (not shown) for video coding of locally-captured video and terminal 210 may include functional blocks (also not shown) for decoding of coded video data received from the terminal 250 via the network 240. Although it is envisioned that the principles of the present disclosure may be applied at coders resident at either terminal 210, 250, the functional blocks provided for the terminal 250 to terminal 210 coding direction are omitted from FIG. 2 merely to simplify the present discussion.

FIG. 3 illustrates a functional block diagram of a video coder 300 according to an embodiment of the present disclosure. The video coder 300 may include a Y' coder 310, a Cr coder 320, a Cb coder 330, a Min/Max Estimator 340 and clipping units 342, 344. The video coder 300 may accept input video data as component signals Y', Cr, and Cb, which are input to their respective coders 310-330. The coders 310-330 may output coded video data to the transmitter, which may be assembled into a coded video stream that conforms to syntax requirements of the governing coding standard.

The Min/Max Estimator 340 may estimate whether to clip data output from one or both of the Cr and Cb coders 320, 330 based on the coded Y' data output from the Y' coder 310. In an embodiment, Min/Max Estimator 340 may determine the maximum and minimum values of one or both of Cr and Cb based on the coded Y' data output from the Y' coder. The Min/Max Estimator 340 may then determine whether to clip data output from one or both of the Cr and Cb coders based on a comparison of such data with the determined maximum and minimum values for each respectively. For example, for each component, the Min/Max Estimator 340 may determine that all values outside the range established by the maximum and minimum values for that component must be clipped. In an embodiment, the Min/Max Estimator 340 may determine that only those values that are beyond a threshold distance of the range established by the maximum and minimum values for that component must be clipped. In an embodiment, the Min/Max Estimator 340 may determine the maximum and minimum values for one of the color components (for example, Cr) based on the coded Y' data. The Min/Max estimator 340 may determine which values of the coded Cr must be clipped based on the maximum and minimum values and send a corresponding clip signal to clip unit 342. The Min/max estimator 340 may then consider the coded video data for the Cr component that is within the determined Cr maximum and minimum values in addition to coded Y' data when determining whether to clip coded video data of the other color component (Cb, in the above example). The Min/Max Estimator 340 may output clip control signals to the clip units 342, 344, which modify coded Cr and/or Cb data as directed.

In an embodiment, Min/Max Estimator 340 may adjust the determined maximum/minimum values for one or more components to compensate for effects that can interfere with the encoder output such as quantization noise or other sources of interference. Min/Max Estimator 340 may allow an additional offset to expand the allowed range of values for one or more particular components beyond the determined maximum and minimum values for those components. The offset may be based on the amount and/or level of effects affecting the encoder output.

In an embodiment, clip units 342 and 344 may adjust the number of bits required to represent their respective components based on the determined maximum and minimum values of one or both of Cr and Cb. Instead of allocating a fixed number of bits per component value, Clip units 342 and 344 may adjust the number of bits based on the determined maximum and minimum values for one or both of Cr and Cb. For example, if the value of the Y' component is calculated as zero, then Clip units 342 and 344 may adjust the bit representation such that no additional information is be signaled, since in this case Cb and Cr values are implied to be zero as well. Similarly, a decoder, after decoding a Y' value of 0, may determine that no additional Cb and Cr data is present in the bit stream. In an embodiment, given a value for Y', an encoder and/or decoder may compute the bitdepth required to cover all possible Cb values, whereas similarly given both Y' and Cb an encoder and/or decoder may adjust the number of bits allocated for Cr.

The majority of digital image and video applications employ a Y'CbCr color space encoding for the representation of images, given its ability to accommodate human visual perception better than other color spaces such as RGB or XYZ. Y'CbCr, also called YCbCr, Y'UV, or YUV, comprises of a luma (Y') component, and two chroma/color components (Cb and Cr). In its most common form, the Y' component may be an approximation of the luminance/brightness information of the image (Y) of the CIE 1931 XYZ color space.

Therefore, in an embodiment, the video coder 300 may further include a format conversion unit 305. The format conversion unit 305 may convert images received in an RGB format, for example, into a Y'CbCr format. The format conversion unit 305 may compute Y' as:

$$Y' = w_{YR} R' + w_{YG} G' + w_{YB} B'$$

where the prime (') symbol indicates the application of a transfer function on the original linear light R, G, and B signals. The format converter 305 may apply the transfer function onto the original linear light signals to enable the use of perceptual quantization. This may allow for a more efficient conversion from a floating point to a fixed precision representation for the image signal. The $w_{YR}$, $w_{YG}$, and $w_{YB}$ weights may correspond to the constant weights used for the conversion of the linear light R, G, and B quantities back to the CIE 1931 Y component. The format converter 305 may specify the weights according to the color gamut limitations of the current RGB color space compared to the overall XYZ color space. Also $w_{YR} + w_{YG} + w_{YB} = 1$. In general, conversion from RGB to XYZ is performed using a 3×3 matrix conversion of the form:

$$\begin{bmatrix} X \\ Y \\ Z \end{bmatrix} = \begin{bmatrix} a_{XR} & a_{XG} & a_{XB} \\ a_{YR} & a_{YG} & a_{YB} \\ a_{ZR} & a_{ZG} & a_{ZB} \end{bmatrix} \begin{bmatrix} R \\ G \\ B \end{bmatrix}$$

with the a weights relating to the gamut limitations of the RGB color space in question. Common RGB color spaces currently in use include the ITU-R BT.601, BT.709 (sRGB), BT.2020, Adobe RGB, scRGB, CIE RGB, P3DCI, and P3D65 color spaces among others.

Given a particular RGB color space, the format converter 305 may calculate the Cb and Cr components in the YCbCr as:

$$Cb = \frac{B' - Y'}{\text{alpha}} \text{ with alpha} = 2 * (1 - w_{YB}) \text{ and}$$

$$Cr = \frac{R' - Y'}{\text{beta}} \text{ with beta} = 2 * (1 - w_{YR}).$$

In an embodiment, the format converter 305 may compute values of alpha and beta in such a way so as to guarantee that Cb and Cr are always within the range of [−0.5, 0.5]. Cb may be equal to −0.5 when B' is equal to 0 and G'=R'=1, and Cb may be equal to 0.5 B' when is equal to 1, and G'=R'=0. Similarly, Cr may be equal to −0.5 when R' is equal to 0 and G'=B'=1, and Cr may be equal to 0.5 when R' is equal to 1, and G'=B'=0.

The format converter 305 may output each component of the Y'CrCb color space to a respective coder. Each coder may perform a processing operation upon its respective component as described herein and output the coded component to the min/max estimator 340 as well as to the respective clipping unit.

Given the relationship of Cb or Cr with Y' as well as of Y' with B' and R' respectively, the limits on each component may be impacted by the value of Y'. Therefore, if the min/max 340 estimator determines Y', then it may derive a range of values for Cb and/or Cr. More specifically, if Y'=Y'$_C$ then the following applies:

If Y'$_C$ ≤ $w_{YR} + w_{YG} = 1 - w_{YB}$ then the min/max estimator 340 may compute the minimum value for Cb as $$\frac{-Y'_C}{\text{alpha}} = \frac{-Y'_C}{2*(1 - w_{YB})},$$

i.e. when B'=0 and Y'$_C$ consists of only R' and G'. Otherwise, the minimum would occur when G'=R'=1, in which case $$B' = \frac{Y'_C - (w_{YR} + w_{YG})}{w_{YB}} = \frac{Y'_C - (1 - w_{YB})}{w_{YB}}.$$

In this case, the min/max estimator 340 may calculate the minimum value for Cb as $$\frac{Y'_C - (1 - w_{YB}) - w_{YB} * Y'_C}{2 * (1 - w_{YB}) * w_{YB}}.$$

In an embodiment, these two equations for minimum Cb may combine as:

$$\min Cb = \frac{\max(0, Y'_C - (1 - w_{YB})) - w_{YB} * Y'_C}{2 * (1 - w_{YB}) * w_{YB}}.$$

The Min/Max Estimator 340 may apply this equation in its derivation of minCb.

If, on the other hand, Y$_C$' ≥ $w_{YB}$ then the min/max estimator 340 may compute the maximum value for Cb as $$\frac{1 - Y'_C}{\text{alpha}} = \frac{1 - Y'_C}{2 * (1 - w_{YB})},$$

i.e. when B'=1 regardless of what the values for R' and G' may be. Otherwise, the maximum would occur when G'=R'=0, in which case $$B' = \frac{Y'_C}{w_{YB}}.$$

In this scenario, the min/max estimator 340 may compute the maximum Cb value as $$\frac{Y'_C - w_{YB} * Y'_C}{2 * (1 - w_{YB}) * w_{YB}}.$$

In an embodiment, these the two equations for maximum Cb may combine as:

$$\max Cb = \frac{\min(w_{YB}, Y'_C) - w_{YB} * Y'_C}{2 * (1 - w_{YB}) * w_{YB}}.$$

The Min/Max Estimator 340 may apply this equation in its derivation of maxCb.

In an embodiment, given Y'=Y'$_C$, the min/max estimator may compute the minimum and maximum values for Cr as:

$$minCr = \frac{\max(0, Y'_C - (1 - w_{YR})) - w_{YR} * Y'_C}{2 * (1 - w_{YR}) * w_{YR}}$$

$$maxCr = \frac{\min(w_{YR}, Y'_C) - w_{YR} * Y'_C}{2 * (1 - w_{YR}) * w_{YR}}$$

In an embodiment, the min/max estimator 340 may derive two components (for example, Y'=Y'$_C$ and Cb=Cb$_C$). In this case, the min/max estimator 340 may determine the relationship between R' and the known values for Y' and Cb as:

$$R' = \frac{Y' - w_{YG}G' - w_{YB}B'}{w_{YR}} = \frac{Y'_C - w_{YG}G' - w_{YB}(2*(1-w_{YB})*Cb_C + Y'_C)}{w_{YR}}$$

Given the above relationship between R', the known values for Y' and Cb, the min/max estimator 340 may also derive the values for B/B'.

In an embodiment, if Y'$_C$≤w$_{YB}$*B'+w$_{YG}$=w$_{YB}$(2*(1-w$_{YB}$))*Cb$_C$+Y'$_C$)+w$_{YG}$ then the min/max estimator 340 may calculate the minimum value for Cr as $$\frac{-Y'_C}{\text{beta}} = \frac{-Y'_C}{2*(1-w_{YR})},$$

i.e. when R'=0 and Y'$_C$ consists of only B' and G'. Otherwise, the minimum may occur when G'=1, in which case $$R' = \frac{Y'_C - (w_{YG} + w_{YB}*B')}{w_{YR}} = \frac{Y'_C - (w_{YG} + w_{YB}*(2*(1-w_{YB})*Cb_C + Y'_C))}{w_{YR}}.$$

In this case, the min/max estimator 340 may calculate the minimum Cr as $$\frac{Y'_C - (w_{YG} + w_{YB}*(2*(1-w_{YB})*Cb_C + Y'_C)) - w_{YR}*Y'_C}{2*(1-w_{YR})*w_{YR}}.$$

In an embodiment, these two equations may combine as:

$$minCr = \frac{\max(0, Y'_C - (w_{YG} + w_{YB}*(2*(1-w_{YB})*Cb_C + Y'_C))) - w_{YR}*Y'_C}{2*(1-w_{YR})*w_{YR}}$$

The Min/Max Estimator 340 may apply this equation in its derivation of minCr.

In an embodiment, if Y'$_C$≥w$_{YR}$+w$_{YB}$*B' then the min/max estimator 340 may calculate the maximum value for Cr as $$\frac{1 - Y'_C}{\text{beta}} = \frac{1 - Y'_C}{2*(1-w_{YR})},$$

i.e. when R'=1 regardless of what the value of G' is. Otherwise, the maximum may occur when G'=0, in which case $$R' = \frac{Y'_C - w_{YB}*B'}{w_{YR}}.$$

In this scenario, the min/max estimator 340 may calculate the maximum Cr value as $$\frac{Y'_C - w_{YB}*B' - w_{YR}*Y'_C}{2*(1-w_{YR})*w_{YR}}.$$

In an embodiment, these two equations may combine as:

$$maxCr = \frac{\min(w_{YR}, Y'_C - w_{YB}*B') - w_{YR}*Y'_C}{2*(1-w_{YR})*w_{YR}}$$

$$= \frac{\min(w_{YR}, Y'_C - w_{YB}*(2*(1-w_{YB})*Cb_C + Y'_C)) - w_{YR}*Y'_C}{2*(1-w_{YR})*w_{YR}}$$

The Min/Max Estimator 340 may apply this equation in its derivation of maxCr. In an extreme case, if $$Cb = \frac{Y'_C}{2*w_{YB}}$$

then Cr=0.

Similarly for Cb, given Y' and Cr, the min/max estimator 340 may calculate the limits of Cb as:

$$minCb = \frac{\max(0, Y'_C - (w_{YG} + w_{YR}*(2*(1-w_{YR})*Cr_C + Y'_C))) - w_{YB}*Y'_C}{2*(1-w_{YB})*w_{YB}}$$

$$maxCb = \frac{\min(w_{YB}, Y'_C - w_{YR}*(2*(1-w_{YR})*Cr_C + Y'_C)) - w_{YB}*Y'_C}{2*(1-w_{YB})*w_{YB}}$$

and, if $$Cr = \frac{Y'_C}{2*w_{YR}}$$

the Cb=0. Additionally, if Y=0, then both Cb and Cr components may be equal to 0.

Figure 4:
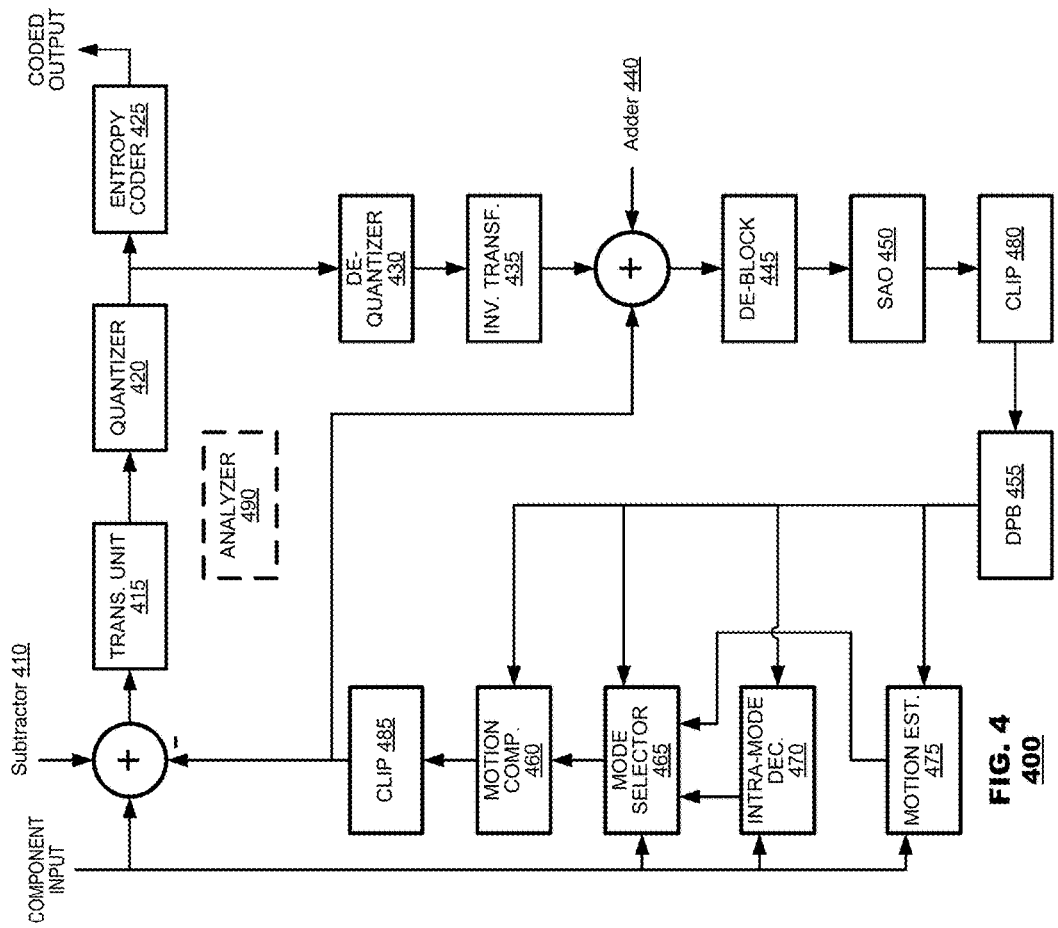
FIG. 4 illustrates an encoding unit according to an embodiment of the present disclosure.

FIG. 4 illustrates an encoder system 400 according to an embodiment of the present disclosure. The encoder system 400 illustrates basic coding operations that may be performed by any of the color-specific coders 310-330 of FIG. 3 on input component data that has been parsed into predetermined units, called "pixel blocks" herein. The encoder system 400 may include a subtractor 410, a transform unit 415, a quantizer 420, an entropy coder 425, a dequantizer 430, an inverse transform unit 435, an adder 440, a deblocking unit 445, a sample adaptive offset (SAO) filter 450, a decoder picture buffer (DPB) 455, a motion compensation/intra prediction unit 460, a mode selector 465, an intra-mode decision unit 470, and a motion estimator 475.

The subtractor 410 may receive an input color component pixel block at a first input and a predicted pixel block at a second input. The subtractor 410 may generate data representing a difference between an input pixel block and the predicted pixel block. The transform unit 415 may convert the difference to an array of transform coefficients, as by a discrete cosine transform (DCT) process or wavelet transform, for example. The quantizer 420 may quantize the transform coefficients obtained from the transform unit 415 by a quantization parameter QP (not shown). The entropy coder 425 may code the quantized coefficient data by run-value coding, run-length coding, arithmetic coding or the like, and may generate coded video data, which is outputted from the encoder system 400. The output signal may then undergo further processing for transmission over a network, fixed media, etc.

The encoder system 400 may include a prediction loop that includes the dequantizer 430, inverse transform unit 435, adder 440, deblock filter 445 and SAO filter 450. The inverse transform unit 435 may reverse the quantization performed by the quantizer 420. The inverse transform unit 435 may apply an inverse transform on the de-quantized data, which inverts operations of the transform unit 415.

The adder 440 may be coupled to the inverse transform unit 435 and may receive, as an input, the inverse transformed data generated by the inverse transform unit 435. The adder 440 may also receive an input from the mode selector 465, which will be described in further detail below. The adder 440 may output resultant data to the deblocking filter 445, which may reduce/remove artifacts of block encoding. The SAO filter 450 may be coupled to the deblocking unit 445 for further filtering. The filtered data may then be output from the coder 400.

In an embodiment, the coder 400 may further include a clip unit 480. The clip unit 480 may perform clipping of certain pixels from the filtered data whose color components are outside a valid range after all steps of decoding are completed. For example, the clip unit 480 may operate upon completion of prediction (intra/inter), residual reconstruction, deblocking and SAO filtering. The clip unit 480 may clip pixels whose color components exceed their respective valid range. Clipping at this stage may enforce the valid range imposed by the Y', Cb, and Cr component relationships, as discussed hereinabove.

For reference pictures, pictures that may serve as prediction references for later-received frames, the decoder 400 may assemble reconstructed frames from the SAO filter 450 and store the reconstructed frames in a decoded picture buffer (DPB) 455. The DPB 455 may store the reconstructed frames for use in decoding later-received coded data.

The motion estimator 475 may receive input data and search among frames previously stored in the DPB 455 for content in the reconstructed frames that match the input data. The motion estimator 475 may output to the mode selector 465 data identifying a best-matching pixel blocks from the stored reconstructed frames. Thus, the motion estimator 475, for each desired reference, may derive motion information that would result in an inter prediction hypothesis for the current block to be coded.

The intra-mode decision unit 470 may receive the input signal and determine, from reconstructed data representing decoded portions of the frame currently being coded (e.g., previously-coded pixel blocks in the same frames) a prediction reference that can be developed by intra coding. The intra-mode decision unit 470 may determine prediction references for one or more intra-coding modes. Thus, the intra-mode decision unit 470 may estimate the "best" intra coding mode for the current block to be coded. In an embodiment, each mode may include an associated rate distortion cost, and intra-mode decision unit may estimate the "best" mode by determining which mode has the least rate distortion cost. The intra-mode decision unit 470 may output results of its prediction search to the mode selector 465.

In an embodiment, the coder 400 may derive color component limits as discussed herein during estimation of a prediction mode. The intra-mode decision unit 470 may monitor the number of out of range values generated by each mode. The intra-mode decision unit 470 may eliminate modes having a considerable number of out of range values. In an embodiment, the intra-mode decision unit 470 may compare the number of out of range values generated by each mode to a threshold, if the number of out of range values for a particular mode exceeds the threshold, then that mode is eliminated. Alternatively, the intra-mode decision unit 470 may prioritize different prediction modes over others based on the relative numbers of out of range values that they would generate.

The mode selector 465 may select a coding mode to be applied to the input pixel block on indications furnished by the motion estimator 475 and inter-mode decision unit 470. For example, the mode selector 465 may select from a variety of mode/prediction type, block size, reference modes, or even perform slice/frame level coding decisions including: use of intra, or single or multi-hypothesis (commonly bi-predictive) inter prediction; the size of the prediction blocks; whether a slice/picture shall be coded in intra (I) mode without using any other picture in the sequence as a source of prediction; whether a slice/picture shall be coded in single list predictive (P) mode using only one reference per block when performing inter predictions, in combination with intra prediction; and whether a slice/picture shall be coded in a bi-predictive (B) or multi-hypothesis mode, which allows, apart from single list inter and intra prediction the use of bi-predictive and multi-hypothesis inter prediction. Typically, coding modes are selected to minimize coding distortion and maximized coding efficiency. At times, however, a mode selector 465 may apply a less optimal coding mode to support other coding needs. For example, an intra-coding mode may be applied to inject an I frame into a coded bit stream (to support scrubbing play modes and the like) even if P coding may be more efficient.

The motion compensation/intra prediction unit 460 may receive input from the mode selector 465 and the decoded data from the DPB 455. Based on received information, the motion compensation/intra prediction unit 460 may generate a reference block for the current input that is to be coded. The reference block may then be subtracted from the input component pixel block by the subtractor 410.

In an embodiment, the coder 400 may further include another clip unit 485. The clip unit 485 may provide clipping of certain pixels that are outside a valid range if additional clipping is required at other stages of the reconstruction process. For example, the clip unit 485 may provide clipping before the deblocking 445 or during the interpolation process for the subpixel motion estimation 475 and the compensation 460. The clip unit 485 may clip pixels having one or more color components that exceed the valid range for that component. Clipping at this stage may enforce the valid range imposed by the Y', Cb, and Cr component relationships, as discussed hereinabove.

In an embodiment, when performing intra prediction, the intra-mode decision unit 470 may predict the luma components of the data first. In this case, the coder 400 may perform clipping on subsequently predicted chroma component values, in the same manner as described hereinabove.

The coder 400 may represent a single component coder (i.e. it is meant to perform a processing operation on one component of a color space). In an embodiment, the coder 400 may output its coded component data to the respective coder for each component in a color space (not shown in FIG. 4). In addition, the coder 400 may receive coded component data from the respective coder for each component in the color space (not shown in FIG. 4). In this way, the coder 400 may be able to calculate limit values for its respective component and perform one or more processing operations upon its respective component as described herein. In an embodiment, the coder 400 may receive the determined range of values for each component from a min/max estimator (such as the min/max estimator 340 shown in FIG. 3).

In an embodiment, the coder 400 may include an analyzer 490 to develop metadata providing contextual information for the clipping process. The metadata may be reported to a decoder (FIG. 2) for use in recovery of coded video data. The metadata may include, for example, information representing the source image signal that is input to the coder (FIG. 2). For example, such metadata may describe the color primaries of the source video, transfer functions that operated on the source video, and/or matrix coefficients used during coding. In an embodiment, certain additional parameters may be known beforehand by being coded into the system, in which case metadata may convey information representing departures from these pre-coded parameters. For example, in a case where a channel is capable of handling data in particular color primaries/volume, such as BT.2020, P3D65, or BT.709, metadata parameters may identify circumstances where the source content effectively only covers a more limited color volume, such as BT.709, P3D65 or possibly even less. Metadata parameters may signal, for example, the effective color primaries of the signal. Signaling could be done per region, image, or for a sequence of images. Primaries could be signaling using, for example, the three color primary system (e.g. red, blue, green, and optionally white, since commonly that would coincide with the white of the original color space, with their corresponding points in either the xy (CIE 1931) or u'v' (CIE 1976) colorspaces) or even a more comprehensive color system that may also include secondary colors, e.g. cyan, magenta, and yellow. In another example, brightness characteristics of the signal representation may go up to a particular number X (e.g. 10000), however the signal may never exceed a value Y (e.g. 500). Information also about the original signals limits in terms of hue or saturation, or other properties, such as percentage of data that correspond within particular color volume ranges, could also be provided. This information can be used to further assist in the clipping and processing process of not only the chroma components but also of luma given the more comprehensive information and knowledge about the limitations of the original signal.

Coding protocols typically define a syntax for exchange of video data among different terminals. Many coding protocols allocate bandwidth to permit terminals to exchange data that does not have predetermined meaning under the protocol. For example, the MPEG-4 AVC/H.264 and MPEG-H part 2/HEVC/H.265 coding protocols define Supplemental Enhancement Information ("SEI") and video usability information ("VUI") messages for such purposes. Additional parameters and other metadata may be communicated in such messages. For coding protocols that do not reserve bandwidth for such purposes, communication of additional parameters and other metadata may occur between terminals in a channel that falls outside the syntax occupied by coded video data (e.g., a separate communication channel between the terminals).

In an embodiment, the encoder 400 may use additional parameters to adjust the various equations/processes described herein to achieve more efficient processing. Additionally, the encoder 400 may transmit the additional parameters as described above to a decoder (e.g. the decoder 900, described more fully herein below) to enable the decoder to overcome errors generated during the decoding process, such as induced distortion from de-quantization.

Although the foregoing discussion has presented the analyzer 490 as resident in a coder 400 to develop data representing performance of clipping units therein, the principles of the present disclosure permit analyzers to capture data at different levels of performance within a system. For example, an analyzer (not shown) may find application in a system such as shown in FIG. 3 and develop metadata representing performance of clip units 342 and 344 therein.

Figure 5:
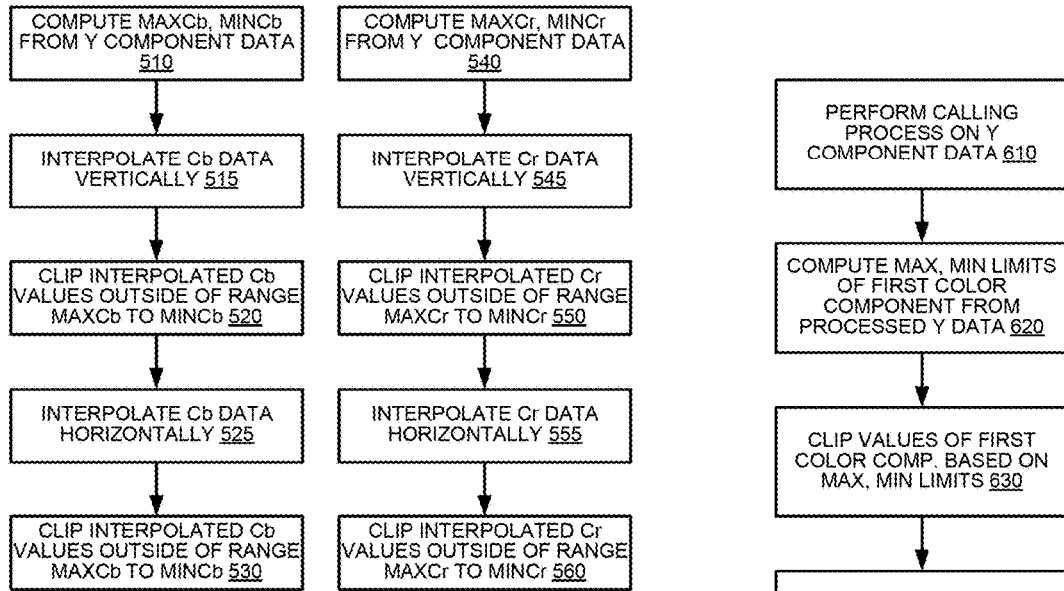
FIG. 5 illustrates a flow diagram of a method according to an embodiment of the present disclosure.

FIG. 5 illustrates a method 500 according to an embodiment of the present disclosure. The method 500 may examine Y component data, which may be at full resolution, and then compute the maxCb and minCb limits as described above (box 510). Then it processes Cb component data, which typically is provided at ¼ resolution of the Y component data. In one implementation, the Cb and Cr data may be at type 0 locations, where the chroma values are located in a co-sited manner with Y' samples horizontally, but in the middle vertically. Further discussion of type 0 may be found in the AVC specification, Annex E (ISO/IEC 14496-10—MPEG-4 Part 10, Advanced Video Coding).

For the Cb component, the method may perform a vertical interpolation using a vertically applied filter (box 515). The method 500 may compare the outcome of the interpolation versus the maxCb and minCb limits defined by the Y component and clip accordingly (box 520). The method 500 may apply horizontal interpolation using the already-clipped results obtained in box 520 (box 525). Interpolated Cb values may be clipped given the Y limits for those positions (box 530).

The method 500 may perform similar operations on Cr component data, also. The method 500 may examine Y component data and compute the maxCr and minCr limits as described above (box 540). For the Cr component, the method may perform a vertical interpolation using a vertically applied filter (box 545). The method 500 may compare the outcome of the interpolation versus the maxCr and minCr limits defined by the Y component and clip accordingly (box 550). The method 500 may apply horizontal interpolation using the already-clipped results obtained in box 550 (box 555). Interpolated Cr values may be clipped given the Y limits for those positions (box 560).

The operations illustrated in boxes 510-530 and in boxes 540-560 may be performed in parallel with each other using Y component data to set the max/min levels of both Cb and Cr component data. Alternatively, they may be performed sequentially. In such a case, the max/min levels of one component may be set using both the Y component data and the processed (and possibly clipped) color component data. For example, if boxes 510-530 are performed prior to performance of boxes 540-560, Cr values may be calculated from both the Y component data and the processed Cb component data. As can be seen, sequential performance of the operations enables method 500 to perform clipping at every processing step to avoid propagation of an unclipped signal, and thus the possibility of more severe errors in any subsequent steps.

The method 500 of FIG. 5 finds application with processing operations that involve spatial processing of image data in multiple directions, for example interpolation, upconversion, scaling, downconversion and downsampling. Whereas FIG. 5 illustrates interpolation as the spatial processing (in boxes 515, 525, 545 and 555), in other embodiments of the present invention, upsampling or other processing may be performed in those boxes.

In an embodiment, the processing may be an adaptive downconversion scheme where a processing system may develop knowledge of the upconversion method that will be used (i.e. if downconverting from 4:4:4 to 4:2:0 and the upconversion scheme likely uses a particular set of upsampling filters). In such a case, the method 500 may apply the clipping range during the decision process to provide a more accurate estimate of the distortion that could be introduced given a particular downconversion decision. This may improve performance during the downconversion decision process.

Figure 6:
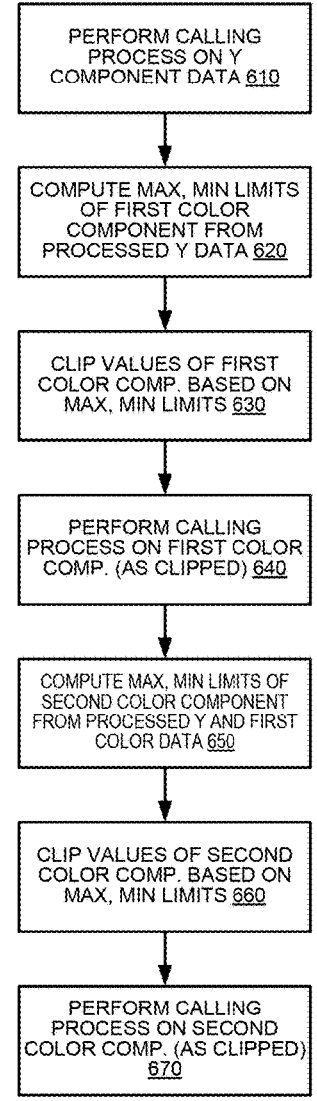
FIG. 6 illustrates a flow diagram of a method according to an embodiment of the present disclosure.

FIG. 6 illustrates a method 600 according to another embodiment. The method 600 of FIG. 6 may find application in processing operations that involve a single iteration of processing. For example, the method 600 may be employed for systems that perform denoising, frame rate conversion, debanding, inpainting, deringing, deblocking, dithering, and other such processing methods. When such a process is performed in connection with the method 600 of FIG. 6, it is deemed the "calling process" for discussion purposes.

The method 600 may begin by performing a calling process on Y component data (box 610). Thereafter, the method 600 may compute max and min limits for a first color component based on the processed Y data (box 620). The method 600 may clip first color component values that exceed the max and min limits computed in box 620 (box 630). Thereafter, the method 600 may perform the calling process on the first color component data obtained in box 640, which may or may not have been clipped as determined by the limits (box 640).

The method 600 may compute max and min limits for a second color component based on the processed Y data and the processed first color component data (box 650). The method 600 may clip second color component values that exceed the max and min limits computed in box 650 (box 660). Thereafter, the method 600 may perform the calling process on the second color component data obtained in box 660, which may or may not have been clipped as determined by the limits computed in box 650 (box 670).

Figure 7:
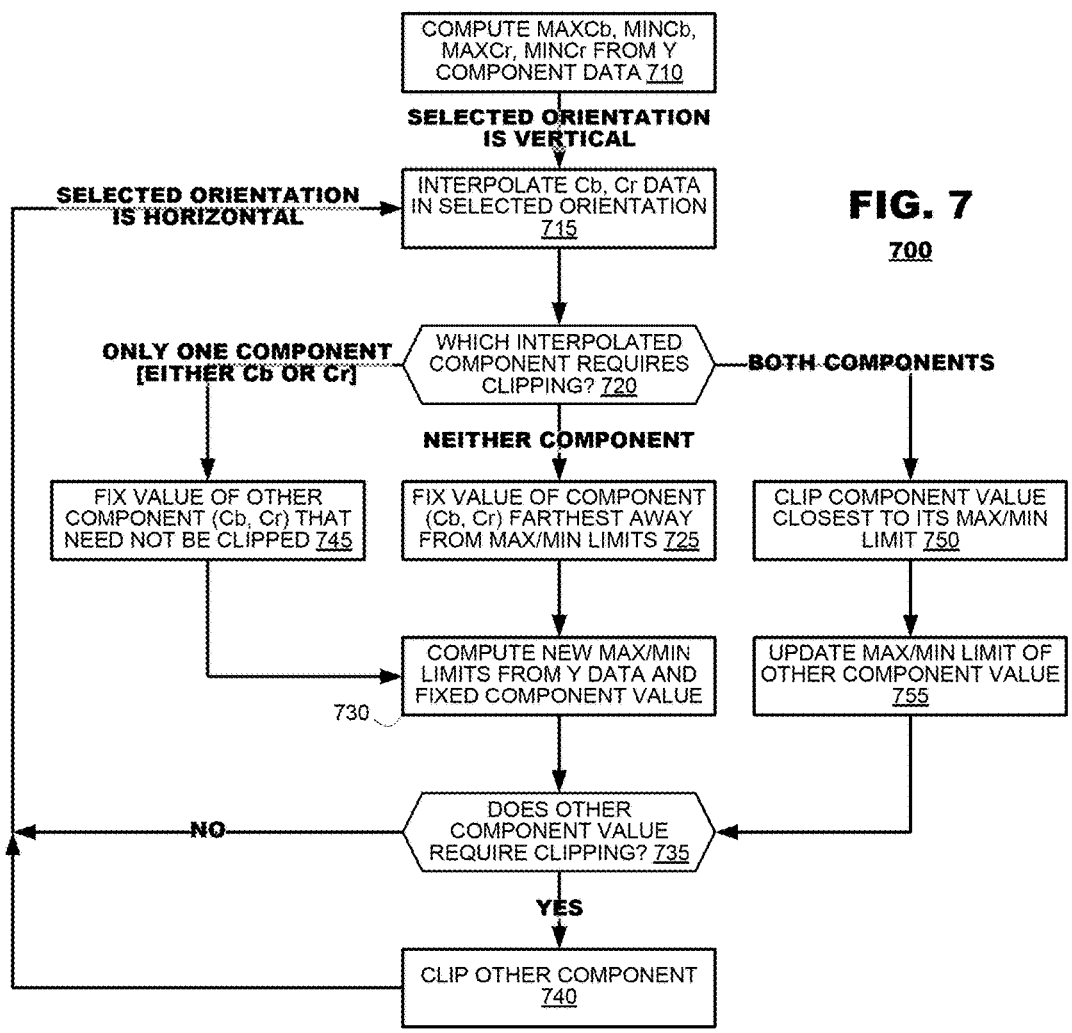
FIG. 7 illustrates a flow diagram of a method according to an embodiment of the present disclosure.

FIG. 7 illustrates another method 700 according to an embodiment of the present disclosure. As with the method 500 of FIG. 5, the method 700 finds application with processing operations that involve spatial processing of image data in multiple directions, for example interpolation, upconversion, and scaling. Whereas FIG. 7 illustrates interpolation as the spatial processing to be performed (referenced in boxes 715 and 720), in other embodiments of the present invention, upsampling or other processing may be performed in those boxes.

The method 700 may begin by calculating maxCb, minCb, maxCr, and minCr values from the Y component data (box 710). The method 700 then may perform a first iteration of clip processing (boxes 715-755), using vertical interpolation. Specifically, the method 700 may interpolate Cb and Cr data in the selected interpolation direction (box 715). Thereafter, the method 700 may determine whether any interpolated component (Cb and/or Cr) requires clipping (box 720).

If neither component requires clipping, then the method may identify a component, either Cb or Cr, that is "furthest" away from its associated limits. The method 700 may "fix" the identified component, indicating that no clipping of the fixed component is required (box 725). For example, if the distance of the Cb component to the maxCb and minCb limits is less than the distance of the Cr component to the maxCr and minCr limits, the Cb component is designated as "fixed." The method 700 may revise the max/min limits of the other color component (Cr in the example above) (box 730). The method 700 may determine whether the other component (Cr) requires clipping (box 735) and, if so, performs clipping on that color component (box 740).

In some cases, the Cr component will be designated as fixed during performance of box 725 and the maxCb and minCb values will be revised during performance of box 730. Thus, the designation of "fixed" and "other" color components will be determined by the values of the Cb and Cr data obtained from interpolation.

At box 720, it may be determined that only one of the interpolated color components requires clipping (say, component Cb). In this case, the other color component (Cr) may be designated as "fixed" (box 745). Thereafter, the method 700 may advance to box 730 to revise the max/min limits of the component that was identified as requiring clipping. In boxes 735 and 740, if the component (Cb) still requires clipping in view of the revised max/min limits, it will be clipped.

At box 720, it may be determined that both interpolated color components require clipping. In this case, the method 700 may identify the component value (say, Cr) that is closest to its max or min limit and may clip that value (box 750). Thereafter, the method 700 may revise the max/min limits for the other component (Cb in the foregoing example). The method may advance to box 735. In boxes 735 and 740, if the component (Cb) still requires clipping in view of the revised max/min limits, it will be clipped.

Following completion of box 740 or, if no clipping was required in box 735, operation of the method 700 may return to box 715 for a second iteration. In the second iteration, horizontal interpolation may be performed. Operation of boxes 720-755 may repeat as before. Upon completion of the second iteration of boxes 720-755, the method 700 may terminate (step not shown).

If desired, the method 700 may perform the interpolation horizontally in the first iteration and vertically in the second iteration. It may be convenient to perform the interpolation first vertically for type 0 chroma sample locations because the method 700 immediately generates the co-sited values for chroma vertically. If the method 700 performs the interpolation horizontally first, the values would not be co-sited with the luma components and computation of the limits becomes slightly more complex. In that case, the method 700 may interpolate luma values at co-sited locations of chroma and compute the limits given those interpolated, and temporary, luma values.

Figure 8:
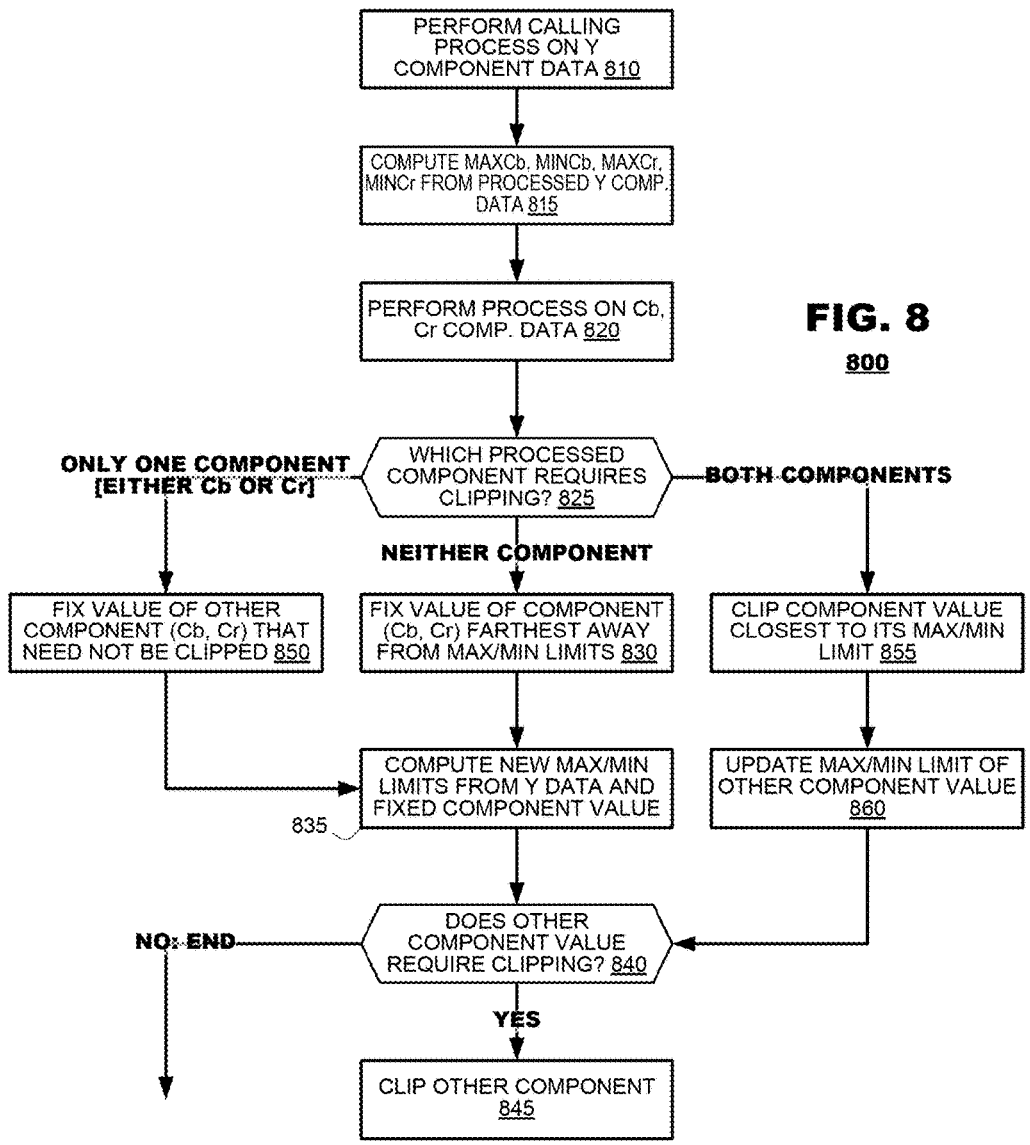
FIG. 8 illustrates a flow diagram of a method according to an embodiment of the present disclosure.

FIG. 8 illustrates a method 800 according to another embodiment. The method 800 of FIG. 8 may find application in processing operations that involve a single iteration of processing. For example, the method 800 may be employed for systems that perform denoising, frame rate conversion, debanding, inpainting, deringing, deblocking, dithering, and other such processing methods. When such a process is performed in connection with the method 800 of FIG. 8, it is deemed the "calling process" for discussion purposes.

The method 800 may begin by performing the calling process on Y component data (box 810). The method 800 may calculate maxCb, minCb, maxCr, and minCr values from the Y component data (box 815). The method 800 may perform the calling process on the Cb and Cr component data (box 820). Thereafter, the method 800 may determine whether any processed color component (Cb and/or Cr) requires clipping (box 825).

If neither processed component requires clipping, then the method may identify a component, either Cb or Cr, that is "furthest" away from its associated limits. The method 800 may "fix" the identified component, indicating that no clipping of the fixed component is required (box 830). For example, if the distance of the Cb component to the maxCb and minCb limits is less than the distance of the Cr component to the maxCr and minCr limits, the Cb component is designated as "fixed." The method 800 may revise the max/min limits of the other color component (Cr in the example above) (box 835). The method 800 may determine whether the other component (Cr) requires clipping (box 840) and, if so, performs clipping on that color component (box 845).

In some cases, the Cr component will be designated as fixed during performance of box 830 and the maxCb and minCb values will be revised during performance of box 835. Thus, the designation of "fixed" and "other" color components will be determined by the values of the Cb and Cr data obtained from processing.

At box 825, it may be determined that only one of the processed color components requires clipping (say, component Cb). In this case, the other color component (Cr) may be designated as "fixed" (box 850). Thereafter, the method 800 may advance to box 835 to revise the max/min limits of the color component that was identified as requiring clipping. In boxes 840 and 845, if the color component (Cb) still requires clipping in view of the revised max/min limits, it will be clipped.

At box 825, it may be determined that both processed color components require clipping. In this case, the method 800 may identify the color component value (say, Cr) that is closest to its max or min limit and may clip that value (box 855). Thereafter, the method 800 may revise the max/min limits for the other component (Cb in the foregoing example) (box 860). The method may advance to box 840. In boxes 840 and 845, if the color component (Cb) still requires clipping in view of the revised max/min limits, it will be clipped.

Following completion of box 845 or, if no clipping was required in box 840, the method 800 may terminate.

Figure 9:
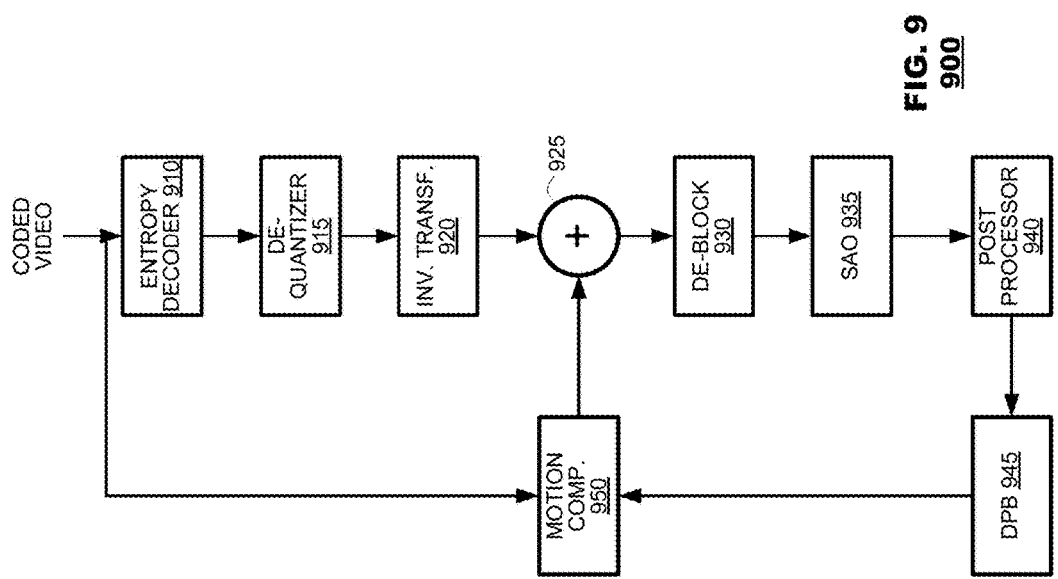
FIG. 9 illustrates a flow diagram of a method according to an embodiment of the present disclosure.

FIG. 9 illustrates a decoder system 900 in accordance with an embodiment of the present disclosure. The decoder system 900 may include an entropy decoder 910, a dequantizer 915, an inverse transform unit 920, an adder 925, a de-blocking unit 930, a sample adaptive offset (SAO) filter 935, a post-processor 940, a decoder picture buffer (DPB) 945 and a motion compensator 950. The decoder system 900 may perform decoding operations according to the same coding protocol applied by the coding system 400 and may comply with MPEG-4, H.263, H.264 and/or HEVC.

The decoder system 900 may generate recovered video data from the coded video data. If an encoder (e.g. encoder 400) coded an element of a source video sequence with reference to a given element of reference picture data, the decoder system 900 may decode coded data of the source video element with reference to the same reference picture data. The motion compensator 950 may retrieve previously-decoded video data from the DPB 945 and supply it to the adder 925 as part of prediction operations.

The entropy decoder 910 may perform decoding of the encoded bitstream to obtain quantized transform coefficients. The dequantizer 915 and inverse transform 920 may then perform inverse quantization and inverse transformation on the quantized transform coefficients respectively to derive a decoded representation of the residual signal. The adder 925 may add the residual signal to predicted frame data transmitted by an encoder (e.g. the encoder 400) and the resulting signal may be fed to one or more loop filters to smooth out artifacts induced by block-wise processing and quantization.

The SAO filter 935 may modify the decoded samples by conditionally adding an offset value to each sample after application of the deblocking filter 930. The SAO filter 935 may introduce nonlinear amplitude mapping within the inter picture prediction loop after the deblocking filter to better reconstruct the original signal amplitudes. In an embodiment, the SAO filter 935 may reconstruct the original signal amplitudes on a region basis, based on a filtering type selected for each coding tree block ("CTB") by the syntax of the metadata message.

The post processor 940 may perform other signal conditioning operations on recovered video obtained from the SAO filter 935. Post-processing may include filtering operations or other video alterations to improve the recovered video for consumption by other components (not shown) within the decoder terminal (FIG. 2). In an embodiment, as part of its operation, the post-processor 940 may select processing operations based on metadata reported to it by an encoder in a Supplemental Enhancement Information (SEI) message or the like.

By way of example, a post processor 940 may receive information in an SEI message that, although the recovered video content is represented in the BT.2020 signal representation, the encoder operated on source content that were contained within a smaller color volume, such as BT.709 or P3D65. In response, the post processor 940 may select a different set of filters, such as filters that enforce clipping of all reconstructed values within the specified smaller color volume, than in a different use case where the encoder operated on video content that utilized the full range of the BT.2020 signal representation. In another example, given this additional information about the signal, a post-processor of limited precision (e.g. 10 or 12-bits) may map the video data for processing given their actual range, with effectively higher precision than it would have been possible without this information. Other examples may include the use of different or simpler tone mappers when remapping the content to a system or display of lower capabilities than the intended format representation. Knowledge of additional information, such as min/max hue or saturation in the signal, could result in filters that operate while trying to preserve the limits of such signals instead. Selection of these different filters would be based on an inference, coded into the post-processor, that encoder clipping proceeded differently for the reduced-range source video than for source video that spanned a larger range of available representations.

In another example, a post processor 940 may receive information in an SEI message that, although brightness of recovered video is represented by data that can go up to a particular number X (e.g. 10,000), the brightness of the source content signal never goes more than Y (e.g. 500). In response, the post processor 940 may select a different set of filters than in a different use case where the encoder operated on video content that utilized the full range of the brightness signal representation. For example, the filters would be able to clip the data given not the full range of the brightness signal representation but given the additional limits specified by the SEI or other metadata mechanism, expand precision of by scaling the data according to their dynamic range and the capabilities of the post-processor, and allow the use of filtering mechanism intended for applications of a lower dynamic range but not suitable for high dynamic range applications above a certain threshold, among others. Again, selection of these different filters would be based on an inference, coded into the post-processor, that encoder clipping proceeded differently for the reduced-range source brightness than for source brightness that spanned a larger range of available representations.

The above strategies are not restricted to any particular color space or primaries, or even chroma data with a specific chroma sampling type (chroma sampling location). The process finds application with data in other color spaces such as Y'u'v', Y'u"v", YDzDx, IPT, YCbCr using any color primaries such as BT.709, BT.2020, P3D65 etc., both constant and non-constant luminance representations, sampling types 0, 1, 2, etc. The two chroma samples also need not be co-sited, i.e. do not need to have been sampled with the same phase.

As it has been discussed earlier, the above techniques could apply to any processing scheme that could be used on the image or video data, apart from chroma upconversion or scaling. This may include denoising such as spatio-temporal filtering, frame rate conversion, debanding, inpainting, deringing, deblocking, dithering, and many other processing methods that are commonly applied on image and video data.

The foregoing discussion has described operation of the embodiments of the present disclosure in the context of terminals that embody encoders and/or decoders. Commonly, these components are provided as electronic devices. They can be embodied in integrated circuits, such as application specific integrated circuits, field programmable gate arrays and/or digital signal processors. Alternatively, they can be embodied in computer programs that execute on personal computers, notebook computers, tablet computers, smartphones or computer servers. Such computer programs typically are stored in physical storage media such as electronic-, magnetic- and/or optically-based storage devices, where they are read to a processor under control of an operating system and executed. Similarly, decoders can be embodied in integrated circuits, such as application specific integrated circuits, field programmable gate arrays and/or digital signal processors, or they can be embodied in computer programs that are stored by and executed on personal computers, notebook computers, tablet computers, smartphones or computer servers. Decoders commonly are packaged in consumer electronics devices, such as gaming systems, DVD players, portable media players and the like; and they also can be packaged in consumer software applications such as video games, browser-based media players and the like. And, of course, these components may be provided as hybrid systems that distribute functionality across dedicated hardware components and programmed general-purpose processors, as desired.

Several embodiments of the disclosure are specifically illustrated and/or described herein. However, it will be appreciated that modifications and variations of the disclosure are covered by the above teachings and within the purview of the appended claims without departing from the spirit and intended scope of the disclosure.

We claim:

1. A method for processing image data comprising pixels having a luma component value, a first chroma component value and a second chroma component value, comprising:

determining min and max chroma limit values based on the luma component values of input image data according to relationships among the luma and chroma components;

transforming the first chroma component values by performing a processing operation in a first direction to produce first resultant values of the first chroma component;

clipping the first resultant values of the first chroma component that are beyond the min and max chroma limit values to produce second resultant values of the first chroma component;

transforming the second resultant values of the first chroma component by performing the processing operation in a second direction to produce third resultant values of the first chroma component;

clipping the third resultant values of the first chroma component that are beyond the min and max chroma limit values to produce fourth resultant values of the first chroma component;

determining min and max second chroma limit values based on the luma component values, the fourth resultant values of the first chroma component, and the input image data according to relationships among the luma and chroma components;

transforming the second chroma component values by performing a processing operation in a first direction to produce first resultant values of the first chroma component;

clipping the first resultant values of the second chroma component that are beyond the min and max second chroma limit values to produce second resultant values of the second chroma component;

transforming the second resultant values of the second chroma component by performing the processing operation in a second direction to produce third resultant values of the second chroma component; and clipping the third resultant values of the second chroma component that are beyond the min and max second chroma limit values to produce fourth resultant values of the second chroma component.

2. The method of claim 1, wherein the processing operation is one of a denoising, frame rate conversion, debanding, inpainting, deringing, deblocking, and dithering operation.

3. The method of claim 1, wherein the luma component used in the determinations is obtained by performing the processing operation on the luma component of the input image data.

4. The method of claim 1, further comprising adjusting a number of bits required to represent each chroma component based on the determined chroma limit values for that component.

5. The method of claim 1, further comprising adjusting the determined chroma limit values for each chroma component based on a level of interference.

6. The method of claim 1, wherein the processing operation is mode prediction, and modes producing chroma component values outside their respective determined limit values are discarded.

7. The method of claim 1, further comprising:
coding the first and second clipped chroma components according to a predictive coding operation;
capturing statistics representing performance of the first and second clipping steps; and
transmitting, in a channel, data representing the coded chroma components and the captured statistics.

8. The method of claim 1, further comprising transmitting, in a channel, data representing the clipped chroma components and data representing characteristics of input image data.

9. A non-transitory computer readable media comprising instructions that, when executed by a processor, cause:
- determining, from image data comprising pixels having a luma component value, a first chroma component value and a second chroma component value, min and max chroma limit values based on the luma component values of input image data according to relationships among the luma and chroma components;
- transforming the first chroma component values by performing a processing operation in a first direction to produce first resultant values of the first chroma component;
- clipping the first resultant values of the first chroma component that are beyond the min and max chroma limit values to produce second resultant values of the first chroma component;
- transforming the second resultant values of the first chroma component by performing the processing operation in a second direction to produce third resultant values of the first chroma component;
- clipping the third resultant values of the first chroma component that are beyond the min and max chroma limit values to produce fourth resultant values of the first chroma component;
- determining min and max second chroma limit values based on the luma component values, the fourth resultant values of the first chroma component, and the input image data according to relationships among the luma and chroma components;
- transforming the second chroma component values by performing a processing operation in a first direction to produce first resultant values of the first chroma component;
- clipping the first resultant values of the second chroma component that are beyond the min and max second chroma limit values to produce second resultant values of the second chroma component;
- transforming the second resultant values of the second chroma component by performing the processing operation in a second direction to produce third resultant values of the second chroma component; and
- clipping the third resultant values of the second chroma component that are beyond the min and max second chroma limit values to produce fourth resultant values of the second chroma component.

10. The non-transitory computer readable media of claim 9, wherein the processing operation is one of a denoising, frame rate conversion, debanding, inpainting, deringing, deblocking, and dithering operation.

11. The non-transitory computer readable media of claim 9, wherein the luma component used in the determinations is obtained by performing the processing operation on the luma component of the input image data.

12. The non-transitory computer readable media of claim 9, wherein the instructions further causing adjusting a number of bits required to represent each chroma component based on the determined chroma limit values for that component.

13. The non-transitory computer readable media of claim 9, wherein the instructions further causing adjusting the determined chroma limit values for each chroma component based on a level of interference.

14. The non-transitory computer readable media of claim 9, wherein the processing operation is mode prediction, and modes producing chroma component values outside their respective determined limit values are discarded.

15. The non-transitory computer readable media of claim 9, wherein the instructions further causing:
- coding the first and second clipped chroma components according to a predictive coding operation;
- capturing statistics representing performance of the first and second clipping steps; and
- transmitting, in a channel, data representing the coded chroma components and the captured statistics.

16. The non-transitory computer readable media of claim 9, wherein the instructions further causing transmitting, in a channel, data representing the clipped chroma components and data representing characteristics of input image data.

17. A system for processing image data comprising pixels having a luma component value, a first chroma component value and a second chroma component value, the system comprising:
- a transform unit, configured to transform the first and second chroma components in a first direction and a second direction;
- a limit estimator, configured to determine min and max limit values for first and second chroma components;
- a clipping unit configured to clip output from the transform unit based on the respective min and max limit values from the limit estimator; and
- a controller for controlling the transform unit, the limit estimator, and the clipping unit, where the controller causes:
  - determining, by the limit estimator, min and max chroma limit values based on the luma component values of input image data according to relationships among the luma and chroma components,
  - transforming, by the transform unit, the first chroma component values by performing a processing operation in a first direction to produce first resultant values of the first chroma component,
  - clipping, by the clipping unit, the first resultant values of the first chroma component that are beyond the min and max chroma limit values to produce second resultant values of the first chroma component,
  - transforming, by the transform unit, the second resultant values of the first chroma component by performing the processing operation in a second direction to produce third resultant values of the first chroma component,
  - clipping, by the clipping unit, the third resultant values of the first chroma component that are beyond the min and max chroma limit values to produce fourth resultant values of the first chroma component,
  - determining, by the limit estimator, min and max second chroma limit values based on the luma component values, the fourth resultant values of the first chroma component, and the input image data according to relationships among the luma and chroma components,
  - transforming, by the transform unit, the second chroma component values by performing a processing operation in a first direction to produce first resultant values of the first chroma component,
  - clipping, by the clipping unit, the first resultant values of the second chroma component that are beyond the min and max second chroma limit values to produce second resultant values of the second chroma component, transforming, by the transform unit, the second resultant values of the second chroma component by performing the processing operation in a second direction to produce third resultant values of the second chroma component, and clipping, by the clipping unit, the third resultant values of the second chroma component that are beyond the min and max second chroma limit values to produce fourth resultant values of the second chroma component.

18. The system of claim 17, wherein the processing operation is one of a denoising, frame rate conversion, debanding, inpainting, deringing, deblocking, and dithering operation.

19. The system of claim 17, wherein the luma component used in the determinations is obtained by performing the processing operation on the luma component of the input image data.

20. The system of claim 17, wherein the controller further causes adjusting a number of bits required to represent each chroma component based on the determined chroma limit values for that component.

21. The system of claim 17, wherein the controller further causes adjusting the determined chroma limit values for each chroma component based on a level of interference.

22. The system of claim 17, wherein the processing operation is mode prediction, and modes producing chroma component values outside their respective determined limit values are discarded.

23. The system of claim 17, wherein the controller further causes:

coding the first and second clipped chroma components according to a predictive coding operation;

capturing statistics representing performance of the first and second clipping steps; and transmitting, in a channel, data representing the coded chroma components and the captured statistics.

24. The system of claim 17, wherein the controller further causes transmitting, in a channel, data representing the clipped chroma components and data representing characteristics of input image data.

* * * * *